US012077196B2

(12) United States Patent
Fujitani et al.

(10) Patent No.: US 12,077,196 B2
(45) Date of Patent: Sep. 3, 2024

(54) VARIABLE-GAUGE TRAIN CONTROL APPARATUS

(71) Applicants: Mitsubishi Electric Corporation, Tokyo (JP); Kyushu Railway Company, Fukuoka (JP)

(72) Inventors: Kohei Fujitani, Tokyo (JP); Shinsuke Kadoi, Tokyo (JP); Tsuyoshi Morimitsu, Fukuoka (JP); Yuichi Mimura, Fukuoka (JP); Soichiro Watanabe, Fukuoka (JP)

(73) Assignees: MITSUBISHI ELECTRIC CORPORATION, Tokyo (JP); KYUSHU RAILWAY COMPANY, Fukuoka (JP)

( * ) Notice: Subject to any disclaimer, the term of this patent is extended or adjusted under 35 U.S.C. 154(b) by 592 days.

(21) Appl. No.: 17/274,408

(22) PCT Filed: Sep. 11, 2018

(86) PCT No.: PCT/JP2018/033680
§ 371 (c)(1),
(2) Date: Mar. 8, 2021

(87) PCT Pub. No.: WO2020/053969
PCT Pub. Date: Mar. 19, 2020

(65) Prior Publication Data
US 2022/0048544 A1    Feb. 17, 2022

(51) Int. Cl.
*B61F 7/00*    (2006.01)
*B60L 3/10*    (2006.01)
(Continued)

(52) U.S. Cl.
CPC ................ *B61F 7/00* (2013.01); *B60L 3/106* (2013.01); *B60L 15/20* (2013.01); *H02P 23/08* (2013.01);
(Continued)

(58) Field of Classification Search
CPC .. B61F 7/00; B60L 3/106; B60L 15/20; B60L 2200/26; B60L 2220/42;
(Continued)

(56) References Cited

U.S. PATENT DOCUMENTS

| 4,327,313 | A | * | 4/1982 | Tsuboi | ................ | H02P 23/07 318/52 |
| 4,335,337 | A | * | 6/1982 | Okamatsu | ............... | B60L 3/106 318/52 |
| 2017/0345792 | A1 | * | 11/2017 | Tanimoto | ................ | H01L 24/49 |

FOREIGN PATENT DOCUMENTS

| EP | 0085394 A1 * | 1/1983 | ................ B60L 3/10 |
| EP | 3107204 A1 * | 12/2016 | ............. H02P 29/60 |

(Continued)

OTHER PUBLICATIONS

Keiichiro Kondo, Development of a Traction System for the Gauge changing Train, 2004, IEEE, 2722-2727 (Year: 2004).*

(Continued)

*Primary Examiner* — Bickey Dhakal
(74) *Attorney, Agent, or Firm* — BUCHANAN INGERSOLL & ROONEY PC

(57) ABSTRACT

A variable-gauge train control apparatus includes an inverter that collectively controls the torque of main motors; and a voltage control unit that controls an output voltage of the inverter. When at least one of axles to be driven by the main motors is within the gauge conversion section and at least one of the axles is located outside the gauge conversion section, the voltage control unit treats, as a reference fre-
(Continued)

quency, a value obtained by conversion of an average value of rotational frequencies of the axles located outside the gauge conversion section into the electric angular frequencies of the main motors, and adds up a slip frequency command and the reference frequency to provide the frequency of the output voltage of the inverter.

13 Claims, 12 Drawing Sheets

(51) Int. Cl.
  *B60L 15/20* (2006.01)
  *H02P 23/08* (2006.01)
(52) U.S. Cl.
  CPC ....... *B60L 2200/26* (2013.01); *B60L 2220/42* (2013.01); *B60L 2240/423* (2013.01); *B60L 2240/461* (2013.01); *B60L 2240/465* (2013.01); *B60L 2240/62* (2013.01)
(58) Field of Classification Search
  CPC ......... B60L 2240/423; B60L 2240/461; B60L 2240/465; B60L 2240/06; H02P 23/08
  See application file for complete search history.

(56) References Cited

FOREIGN PATENT DOCUMENTS

| JP | H03265487 | A |   | 11/1991 |
|----|-----------|---|---|---------|
| JP | H0884405  | A |   | 3/1996  |
| JP | 2002233005| A |   | 8/2002  |
| JP | 2004236469| A |   | 8/2004  |
| JP | 2015033241| A | * | 2/2015  |
| JP | 2015033241| A |   | 2/2015  |

OTHER PUBLICATIONS

International Search Report (PCT/ISA/210) and translation and Written Opinion (PCT/ISA/237) mailed on Dec. 11, 2018, by the Japanese Patent Office as the International Searching Authority for International Application No. PCT/JP2018/033680.

Office Action dated Nov. 9, 2021, issued for corresponding Japanese Patent Application No. 2020-546585.

\* cited by examiner

VARIABLE-GAUGE TRAIN CONTROL APPARATUS

FIELD

The present invention relates to a variable-gauge train control apparatus.

BACKGROUND

For a variable-gauge train, an interval between wheels provided for a train car is changed when that train car passes through a gauge converter that interconnects tracks of different gauges. The gauge converter supports a train body so that the wheels are not subjected to the weight of the train body. Furthermore, the gauge converter changes the interval between the wheels by moving the wheels in an axle direction along guide rails while keeping the train body supported. Therefore, the wheels race during the change in the interval between the wheels.

Patent Literature 1 below discloses a control apparatus that reduces the driving force of wheels, when a train car passes through a gauge converter, so as to smoothly perform gauge conversion operation. Patent Literature 1 discloses, as a specific measure for reducing the driving force, that the minimum wheel speed of a platform car not passing through the gauge converter is set as a reference speed for racing/sliding control during the gauge conversion operation. As a result, racing of wheels passing through the gauge converter is detected, so that the torque of a main motor that drives the wheels is reduced.

CITATION LIST

Patent Literature

Patent Literature 1: Japanese Patent Application Laid-open No. 2002-233005

SUMMARY

Technical Problem

If a scheme for collectively controlling a plurality of main motors with a single inverter (hereinafter referred to as a "collective control scheme") is employed for a variable-gauge train, the torque of all the main motors to be driven by the same inverter is reduced when the torque of any of the main motors is reduced by the racing/sliding control. In this case, even the driving force of wheels in contact with rails outside the gauge converter is also reduced, so that the propulsive force of the entire train is reduced. A similar problem arises not only in the case where torque is reduced by the racing/sliding control, but also in the case where the inverter is stopped.

The present invention has been made in view of the above, and an object of the present invention to provide a variable-gauge train control apparatus in a variable-gauge train employing the collective control method, the apparatus being capable of providing the driving force of wheels in contact with rails while preventing over-rotation of racing wheels even in the case where some of a plurality of wheels to be subjected to driving force controlled by a single inverter are racing inside a gauge converter and the other wheels are in contact with the rails outside the gauge converter.

Solution to Problem

In order to solve the above-described problem and achieve the object, a variable-gauge train control apparatus for a variable-gauge train according to the present invention comprises: an inverter to collectively control torque of a plurality of main motors; and a voltage control unit to control an output voltage of the inverter. When at least one of a plurality of axles to be driven by the plurality of main motors is within the gauge conversion section and at least one of the axles is located outside the gauge conversion section, the voltage control unit treats, as a reference frequency, a value obtained by conversion of an average value of rotational frequencies of the axles located outside the gauge conversion section into electric frequencies of the main motors, and adds up the reference frequency and a slip frequency command to provide a frequency of the output voltage. Alternatively, when at least one of a plurality of axles to be driven by the plurality of main motors is within the gauge conversion section and at least one of the axles is located outside the gauge conversion section, the voltage control unit treats, as a reference frequency, a value obtained by conversion of a smallest value of rotational frequencies of the plurality of axles into electric frequencies of the main motors, and adds up the reference frequency and a slip frequency command to provide a frequency of the output voltage.

Advantageous Effects of Invention

The present invention achieves the effect of providing the driving force of the wheels in contact with the rails while preventing over-rotation of the racing wheels when the variable-gauge train passes through the gauge converter.

DESCRIPTION OF EMBODIMENTS

Variable-gauge train control apparatuses according to embodiments of the present invention will be described in detail below with reference to the drawings. Note that the present invention is not limited to the following embodiments.

First Embodiment

Figure 1:
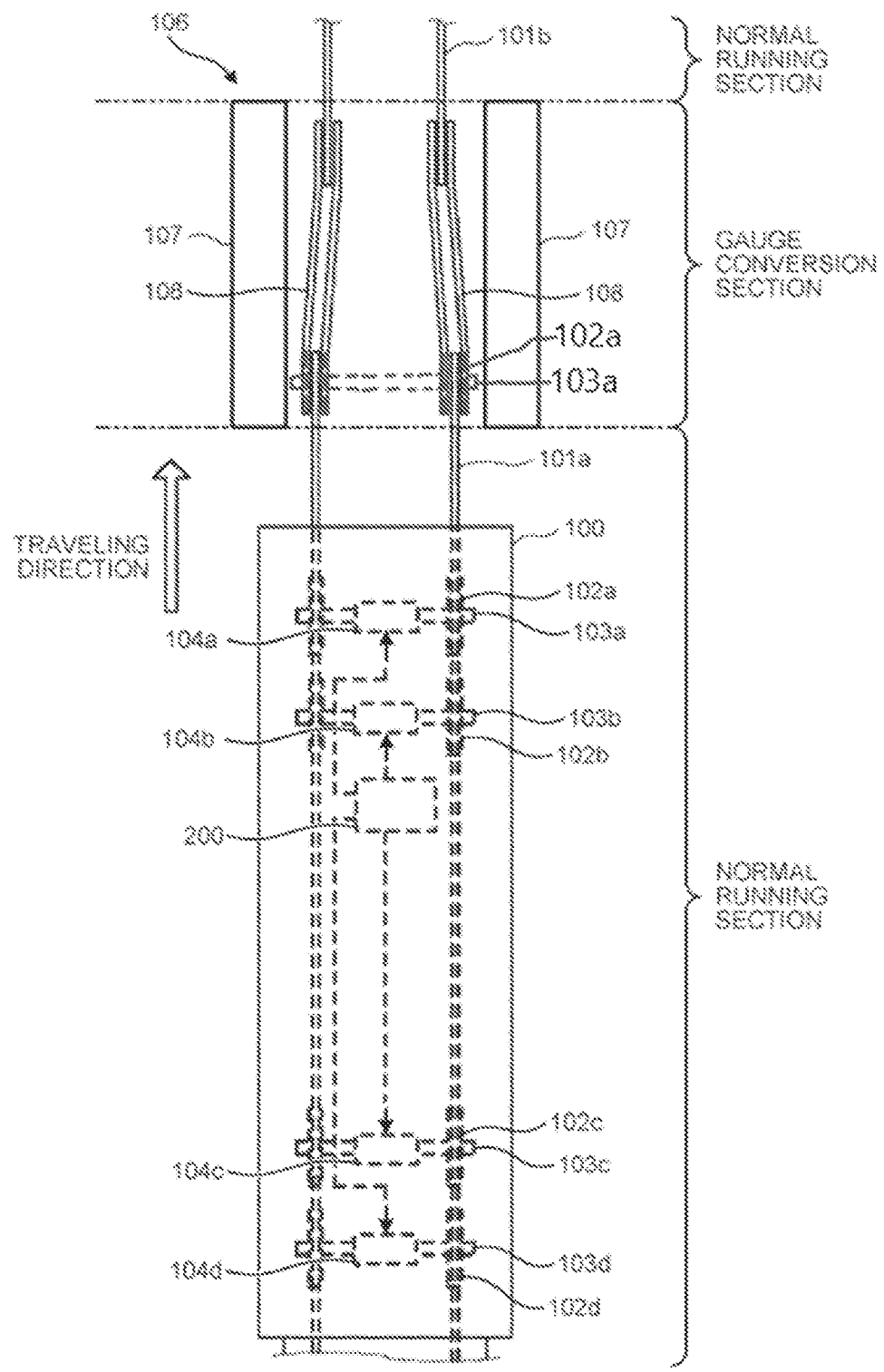
FIG. 1 is a diagram illustrating a configuration of a variable-gauge train according to a first embodiment.

FIG. 1 is a diagram illustrating a configuration of a variable-gauge train according to a first embodiment. As illustrated in FIG. 1, a variable-gauge train 100 according to the first embodiment is an electric railcar that runs directly through tracks 101a and 101b that are different in gauge. As illustrated in FIG. 1, the variable-gauge train 100 includes four pairs of wheels 102a to 102d, four axles 103a to 103d, four main motors 104a to 104d, and a control apparatus 200. Each of the pairs of wheels 102a to 102d is arranged in such a way as to face each other in the direction of the width of a train body. Each of the axles 103a to 103d is a center of rotation of a corresponding one of the pairs of wheels 102a to 102d. The main motors 104a to 104d are provided in association with the four axles 103a to 103d, respectively. The control apparatus 200 is for controlling the torque of the main motors 104a to 104d Here, the torque of the four main motors 104a to 104d refers to torque output by each of the main motors 104a to 104d. Note that the variable-gauge train 100 may be a train of a plurality of connected cars with some of the main motors 104a to 104d installed in a different car from cars having the other main motors installed therein.

Furthermore, the variable-gauge train 100 includes a mechanism (not illustrated) for changing the interval between each of the pairs of wheels 102a to 102d in an axle direction while the variable-gauge train 100 passes through a gauge converter 106 as illustrated in FIG. 1.

The gauge converter 106 is provided between a normal running section of the track 101a and a normal running section of the track 101b. Hereinafter, a section including the gauge converter 106 will be referred to as a gauge conversion section. The gauge converter 106 includes body supports 107 and guide rails 108. While the train body passes through the gauge conversion section, the train body is supported by the body, supports 107 from below. The guide rails 108 guide the wheels 102a to 102d passing through the gauge conversion section.

The body supports 107 support the train body from below so that the wheels 102a to 102d passing through the gauge conversion section are not subjected to the weight of the train body. As a result, any of the pairs of wheels 102a to 102d passing through the gauge conversion section becomes out of contact with rails of the tracks 101a and 101b and suspended in the air. The body supports 107 each have a length in the direction of the length of the variable-gauge train 100, and the length of the body support 107 is large enough to allow the four pairs of wheels 102a to 102d to be suspended in the air.

The guide rails 108, which abut on the wheels 102a to 102d passing through the gauge conversion section, move the wheels 102a to 102d in the axle direction. The wheels 102a to 102d passing through the gauge conversion section move along the guide rails 108 as the variable-gauge train 100 advances. As a result, the wheels 102a to 102d passing through the gauge conversion section move in the axle direction. Therefore, when the variable-gauge train 100 passes through the gauge converter 106, the interval between each of the pairs of wheels 102a to 102d in the axle direction increases or decreases in accordance with the traveling direction of the variable-gauge train 100.

Specifically, assume that the variable-gauge train 100 advances in the traveling direction indicated by an arrow in FIG. 1 and enters the gauge converter 106 from the normal running section of the track 101a. Then, the variable-gauge train 100 is supported by the body supports 107, and as a result, the wheels 102a and 102b passing through the gauge conversion section are not subjected to the weight of the train body. In this case, the wheels 102a and 102b abut on the guide rails 108, such that the interval between each of the pairs of wheels 102a and 102b in the axle direction gradually decreases as the variable-gauge train 100 advances. Similarly, the interval between each of the pairs of wheels 102c and 102d in the axle direction gradually decreases as the variable-gauge train 100 advances. The variable-gauge train 100 advances in the traveling direction indicated by the arrow in FIG. 1, thereby reducing the interval between each of the pairs of wheels 102a to 102d in the axle direction. In contrast to the above, when the variable-gauge train 100 travels in a direction opposite to the arrow in FIG. 1, the interval between each of the pairs of wheels 102a to 102d in the axle direction increases.

Figure 2:
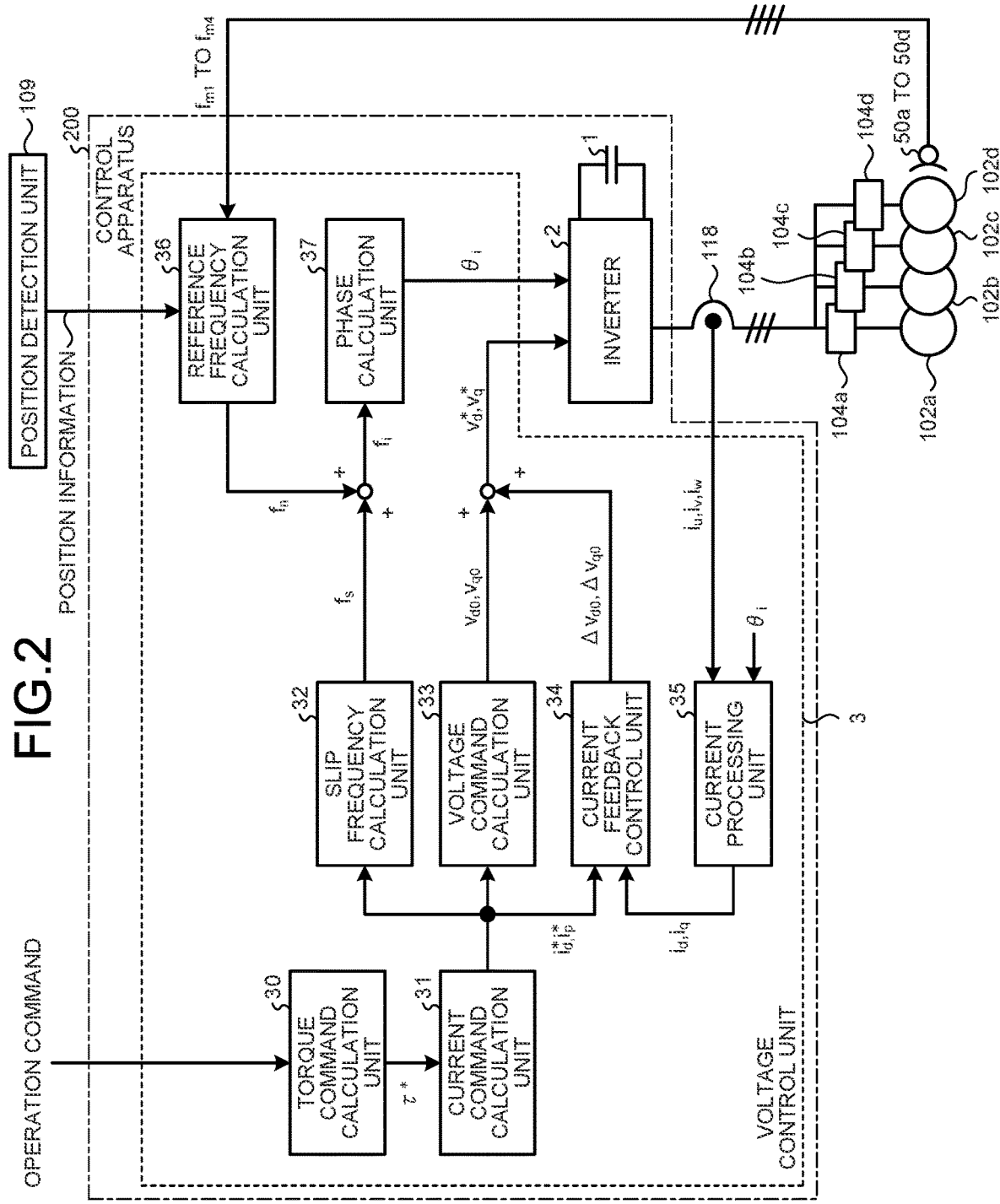
FIG. 2 is a block diagram illustrating a configuration of a control apparatus according to the first embodiment.

A control apparatus 200 according to the present embodiment is a control apparatus to be installed in a variable-gauge train 100. As illustrated in FIG. 2, the control apparatus 200 employs a collective control scheme: a single inverter 2 controls the driving of a plurality of main motors 104a to 104d. Note that in the control apparatus 200 employing the collective control method, the number of the main motors 104a to 104d to be drive-controlled by the single inverter 2 is not limited as long as the number is equal to or greater than two.

As illustrated in FIG. 2, the control apparatus (hereinafter, simply referred to as "control apparatus") 200 to be installed in the variable-gauge train 100 includes a DC power source 1, the inverter 2, and a voltage control unit 3. The inverter 2 collectively controls the torque of the four main motors 104a to 104d. The voltage control unit 3 controls the output voltage of the inverter 2. Furthermore, the voltage control unit 3 includes a torque command calculation unit 30, a current command calculation unit 31, a slip frequency calculation unit 32, a voltage command calculation unit 33, a current feedback control unit 34, a current processing unit 35, a reference frequency calculation unit 36, and a phase calculation unit 37. Input to the control apparatus 200 are position information from a position detection unit 109, detection information from a current sensor 1118 provided for detecting the total value of currents flowing through the four main motors 104a to 104d, and an operation command from a driver's platform (not illustrated). Furthermore, the following description gives an example of vector control for decomposing detected three-phase current values in a stationary coordinate system into currents in a two-axis orthogonal rotating coordinate system, and controlling these currents in controlling the torque of the main motors 104a to 104d. Specifically, the vector control given below by way of example decomposes a U-phase current $i_u$, a V-phase phase current $i_v$, and a W-phase current $i_w$ into a d-axis current $i_d$ and a q-axis current $i_q$ and controls the d- and q-axis currents in controlling the torque of the main motors 104a to 104d. The d-axis current $i_d$ is a current value of a magnet flux axis component of a dq-axis coordinate system, and the q-axis current $i_q$ is a current of a torque axis component of the dq-axis coordinate system. Meanwhile, needless to say, the present invention can also be applied to other than the vector control.

A torque command calculation unit 30 calculates a torque command $\tau^*$ on the basis of notch information included in an operation command. The torque command $\tau^*$ is a command value of torque that should be generated for each of the main motors 104a to 104d. A current command calculation unit 31 calculates, on the basis of the torque command $\tau^*$, a d-axis current command $i_d^*$ and a q-axis current command $i_q^*$ to be sent to the main motors 104a to 104d. Note that the d-axis current command $i_d^*$ and the q-axis current command $i_q^*$ calculated by the current command calculation unit 31 may be current commands to be sent to a single main motor or current commands to be sent to the four main motors.

The slip frequency calculation unit 32 calculates a slip frequency command $f_s$ on the basis of the d-axis current command $i_d^*$ and the q-axis current command $i_q^*$ from the current command calculation unit 31. The slip frequency command $f_s$ is a slip frequency that should be given to the main motors 104a to 104d. The voltage command calculation unit 33 calculates a d-axis voltage command $v_{d0}$ and a q-axis voltage command $v_{q0}$. The d-axis voltage command $v_{d0}$ is based on the d-axis current command $i_d^*$ and the q-axis current command $v_q^*$. The q-axis voltage command $v_{q0}$ is based on the d-axis current command $i_d^*$ and the q-axis current command $i_q^*$. The current processing unit 35 calculates the d-axis current $i_d$ and the q-axis current $i_q$ on the basis of a control phase angle $\theta_i$, and the U-phase current $i_u$, V-phase current $i_v$ and W-phase current $i_w$. The control phase angle $\theta_i$ is calculated by the phase calculation unit 37, which will be described below. The U-phase current $i_u$, V-phase current $i_v$, and W-phase current $i_w$ are detected by the current sensor 118.

The current feedback control unit 34 calculates a d-axis correction amount $\Delta v_{d0}$ and a q-axis correction amount $\Delta_{q0}$ on the basis of the d-axis current command and $i_d^*$ and q-axis current command $i_q^*$ from the current command calculation unit 31 and the d-axis current $i_d$ and q-axis current $i_q$ from the current processing unit 35. The d-axis correction amount $\Delta v_{d0}$ and the q-axis correction amount $\Delta v_{q0}$, which are intended for current feedback control, are a correction amount for the d-axis voltage command and a correction amount for the q-axis voltage command, respectively. The d-axis voltage command $v_{d0}$ calculated by the voltage command calculation unit 33 and the d-axis correction amount $\Delta v_{d0}$ output by the current feedback control unit 34 are added to provide a corrected d-axis voltage command $v_d^*$ to be given to the inverter 2. Furthermore, the q-axis voltage command $v_{q0}$ calculated by the voltage command calculation unit 33 and the q-axis correction amount $\Delta_{q0}$ output by the current feedback control unit 34 are added to provide a corrected q-axis voltage command $v_q^*$ to be given to the inverter 2.

The position detection unit 109 calculates position information on the four axles 103a to 103d on the basis of an output from a device or sensor that outputs position information. The position detection unit 109 outputs the result of the calculation to the reference frequency calculation unit 36. Note that the device or sensor that outputs position information is, for example, an automatic train stop (ATS) ground element or a global positioning system (GPS) receiver.

As illustrated in FIG. 2, rotation sensors 50a to 50d are provided for the axles 103a to 103d, respectively. Each of the rotation sensors 50a to 50d measures a rotational frequency of the corresponding one of the axles 103a to 103d, and outputs the measured rotational frequency to the reference frequency calculation unit 36. Note that in the present embodiment, pieces of information on the rotational frequencies measured by the rotation sensors 50a to 50d are treated as rotational frequencies $f_{m1}$ to $f_{m4}$ each of which is a rotational frequency of the corresponding one of the main motors 104a to 104d. Needless to say, it is possible to perform conversion from the rotational frequency of the main motor to the rotational frequency of the axle or vice versa on the basis of a gear ratio. Furthermore, the main motor has two different types of rotational frequency, one of which is a mechanical frequency that represents the mechanical rotation speed of a rotor. The other type of the rotational frequency is an electric frequency obtained by conversion of the mechanical frequency into the frequency of the electric quantity (electric angle) of a stator circuit. These frequencies can be easily converted based on the number of pole pairs of the main motor. Therefore, in the following description, the mechanical angular frequencies and electric angular frequencies of a wheel, an axle, and a main motor connected to the axle are each considered convertible by use of a constant, and are not strictly distinguished from each other.

A reference frequency calculation unit 36 calculates a reference frequency $f_n$ on the basis of position information from a position detection unit 109 and information on the rotational frequencies from rotation sensors 50a to 50d. Note that a way of calculating the reference frequency $f_n$ will be described below. The reference frequency $f_n$ calculated by the reference frequency calculation unit 36 and a slip frequency command $f_s$ calculated by a slip frequency calculation unit 32 are added and given as an inverter frequency $f_i$ to a phase calculation unit 37. The inverter frequency $f_i$ is the frequency of the output voltage of the inverter 2.

The phase calculation unit 37 calculates a control phase angle $\theta_i$ on the basis of the inverter frequency $f_i$. The control phase angle $\theta_i$ is a phase angle that is referred to when coordinate transformation is performed from a stationary coordinate system to a rotating coordinate system or vice versa. The control phase angle $\theta_i$, can be obtained by integration of the inverter frequency $f_i$.

Figure 3:
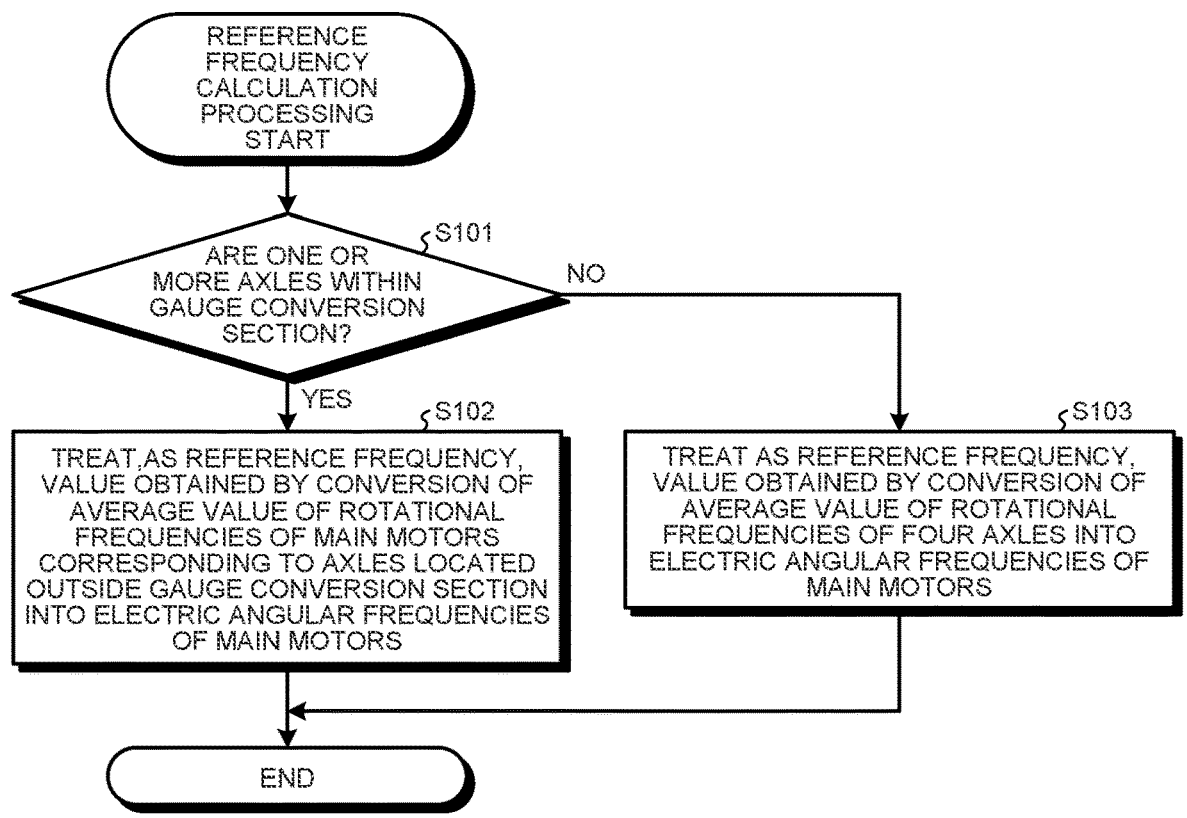
FIG. 3 is a flowchart for describing operation of a main part in the control apparatus of the first embodiment.

Next, operation of a main part of the control apparatus 200 according to the first embodiment will be described with reference to FIGS. 1 to 3 as appropriate. FIG. 3 is a flowchart for describing operation of a main part in the control apparatus 200 of the first embodiment.

The control apparatus 200 performs calculation processing illustrated in FIG. 3, specifically, calculation processing of the reference frequency in a gauge conversion section. As illustrated in FIG. 2, the reference frequency calculation unit 36 receives the position information from the position detection unit 109.

In FIG. 3, when one or more of four axles 103a to 103d are within the gauge conversion section (steps S101, Yes), the reference frequency calculation unit 36 treats, as the reference frequency $f_n$, a value obtained by conversion of the average value of rotational frequencies of axles located outside the gauge conversion section into the electric angular frequencies of main, motors (step S102), which in turn completes the process of the flowchart of FIG. 3. Meanwhile, when all the four axles 103*a* to 103*d* are located outside the gauge conversion section (steps S101, No), the reference frequency calculation unit 36 treats, as the reference frequency $f_n$, a value obtained by conversion of the average value of rotational frequencies of the four axles 103*a* to 103*d* into the electric angular frequencies of the main motors (step S103), which in turn completes the process of the flowchart of FIG. 3.

Next, the significance of performing the above-described processing illustrated in FIG. 3 will be described. When wheels are racing within the gauge conversion section, it is necessary to prevent over-rotation of the wheels. For example, in a train car system employing a control scheme that enables the independent driving of left and right wheels or individual control for each axle (hereinafter referred to as an "individual control scheme"), the driving force of wheels having entered the gauge conversion section just needs to be gradually reduced. Specifically, such a scheme is to reduce the torque of a main motor by racing/sliding control, or place an inverter driving the wheels in a gate-off state, as set forth in Patent Literature 1. For a train car system employing the collective control scheme, when an inverter is controlled in such a way as to reduce torque, the torque of all main motors collectively controlled by the inverter is reduced. As a result, unfortunately, over-rotation of wheels racing within the gauge conversion section can be prevented, but the driving force of wheels in contact with rails outside the gauge conversion section is also reduced, which leads to reduction of the propulsive force of the entire train.

In the first embodiment, control for reducing the torque of a main motor is not performed in the case where some of a plurality of axles to be subjected to driving force controlled by a single inverter are racing within the gauge conversion section and the other axles are in contact with rails outside the gauge conversion section, as described above. At this time, if the reference frequency calculation unit 36 defines the average value of rotational frequencies of the four main motors 104*a* to 104*d* as a reference frequency, the reference frequency is lower than the rotational frequencies of the racing axles, and is higher than the rotational frequencies of the axles in contact with the rails. The slip frequency command is added to this reference frequency to thereby determine the frequency of output voltage of the inverter. This creates a difference between a slip frequency actually generated in the main motor and the slip frequency command.

In the first embodiment, when one or more axles are within the gauge conversion section, the average value of rotational frequencies of axles located outside the gauge conversion section is converted into the electric angular frequencies of the main motors, and the value obtained as a result of the conversion is treated as a reference frequency. In this way, the reference frequency is calculated on the basis of the rotational frequencies of the axles in contact with the rails outside the gauge conversion section, so that slip frequencies actually generated in main motors connected to the axles in contact with the rails are controlled in accordance with the command value. Meanwhile, main motors connected to the axles racing within the gauge conversion section rotate at a frequency that is higher by the amount of the slip frequency command.

Note that the method for calculating the average value of the rotational frequencies of the axles located outside the gauge conversion section is not particularly limited. For example, if only the axle 103*a* is within the gauge conversion section, the rotational frequencies of the axles 103*b* to 103*d* just need to be added together and divided by 3. Alternatively, the rotational frequencies of the axles 103*a* to 103*d* with the rotational frequency of the axle 103*a* substituted with any of the rotational frequencies of the axles 103*b* to 103*d* are added together and divided by 4.

Furthermore, while the above-described gauge conversion operation is being performed, the conventional racing/sliding control becomes ineffective. The racing/sliding control refers to control for reducing the torque of a main motor in an attempt to achieve re-adhesion of wheels upon detection of racing of the wheels. There are various forms of the racing/sliding control. The typical racing/sliding control compares a representative speed (train speed, or the like) with the rotation speed of each pair of wheels and detects the racing of the wheels when the difference between the speeds increases, or on the basis of a sudden change in the acceleration of each pair of wheels.

Thus, according to the control apparatus according to the first embodiment, it is possible to continuously output the driving force of wheels not racing while preventing over-rotation of racing wheels. As a result, it is possible to prevent reduction of the propulsive force of the entire train.

Second Embodiment

For the control described in the first embodiment, axles located outside the gauge conversion section are selected on the basis of the position information on each of the four axles 103*a* to 103*d*, and the average value of the rotational frequencies thereof is converted into the electric angular frequencies of the main motors, and an obtained value is treated as the reference frequency. Unfortunately, some type of position information may make it difficult to identify the individual pieces of position information on the four axles 103*a* to 103*d*.

In some case, for example, only the position information on the foremost axle 103*a* of the train in a traveling direction is received by the control apparatus 200. In this case, the travel distance of the train is calculated by, for example, integration of the train speed, and the individual positions of the remaining three axles 103*b* to 103*d* are estimated on the basis of previously prepared information indicating the positional relationship between axles of the train. Train speed information that can be acquired by the control apparatus 200 may have a low resolution and a long updating cycle, so that estimation results of the individual positions of the four axles 103*a* to 103*d* contain an error.

Figure 4:
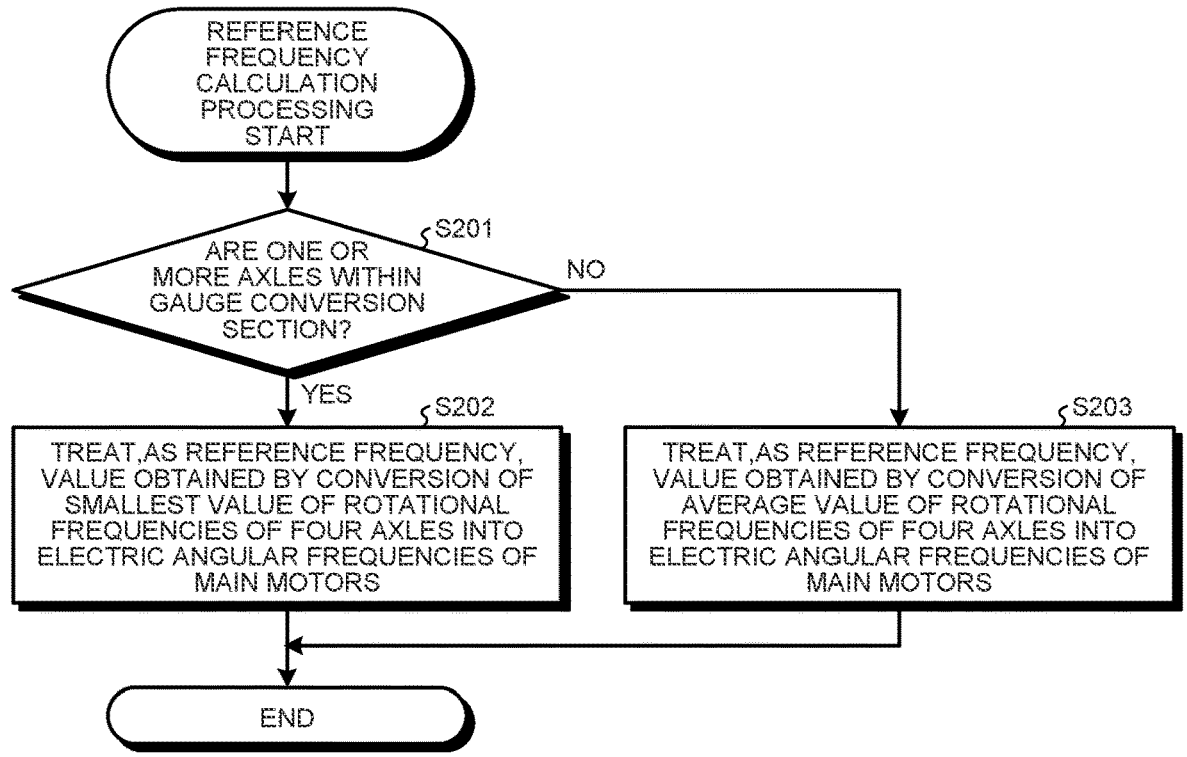
FIG. 4 is a flowchart for describing operation of a main part in a control apparatus of a second embodiment.

In view of this, the control apparatus 200 according to the second embodiment performs calculation processing illustrated in FIG. 4, specifically, calculation processing of reference frequency in the gauge conversion section. As illustrated in FIG. 2, the reference frequency calculation unit 36 receives the position information from the position detection unit 109.

In FIG. 4, when one or more of the four axles 103*a* to 103*d* are within the gauge conversion section (steps S201, Yes), the reference frequency calculation unit 36 treats, as the reference frequency $f_n$, a value obtained by conversion of the smallest value of the rotational frequencies of the four axles 103*a* to 103*d* into the electric angular frequencies of the main motors (step S202), which in turn completes the process of the flowchart of FIG. 4. Meanwhile, when all the four axles 103*a* to 103*d* are located outside the gauge conversion section (steps S201, No), the reference frequency calculation unit 36 treats, as the reference frequency $f_n$, a value obtained by conversion of the average value of the rotational frequencies of the four axles 103*a* to 103*d* into the electric angular frequencies of the main motors (step S203), which in turn completes the process of the flowchart of FIG. 4.

Next, the significance of performing the above-described processing illustrated in FIG. 4 will be described. As described above, axles and wheels race while supported by body supports 107 within the gauge conversion section. At this time, in order to prevent a decrease in the propulsive force of the entire train, the control apparatus 200 according to the second embodiment does not perform control such that the torque of main motors is reduced. That is, a non-zero slip frequency command is calculated in accordance with the operation command, and the slip frequency command and the reference frequency are added to obtain an output voltage frequency of the inverter.

If any of the four axles 103a to 103d enters the gauge conversion section with the slip frequency command of a non-zero positive value, the axle having entered the gauge conversion section accelerates by the amount of the slip frequency command, so that the axle races. As described above, in the control apparatus 200 according to the second embodiment, when one or more of the four axles 103a to 103d are within the gauge conversion section, the reference frequency calculation unit 36 treats, as the reference frequency $f_n$, a value obtained by conversion of the smallest value of the rotational frequencies of the four axles 103a to 103d into the electric angular frequencies of the main motors. Therefore, any of the rotational frequencies of the axles located outside the gauge conversion section is automatically selected. As a result, even when the control apparatus 200 cannot acquire the position information on each of the four axles 103a to 103d, it is possible to achieve the same effect as that of the first embodiment.

Third Embodiment

Figure 5:
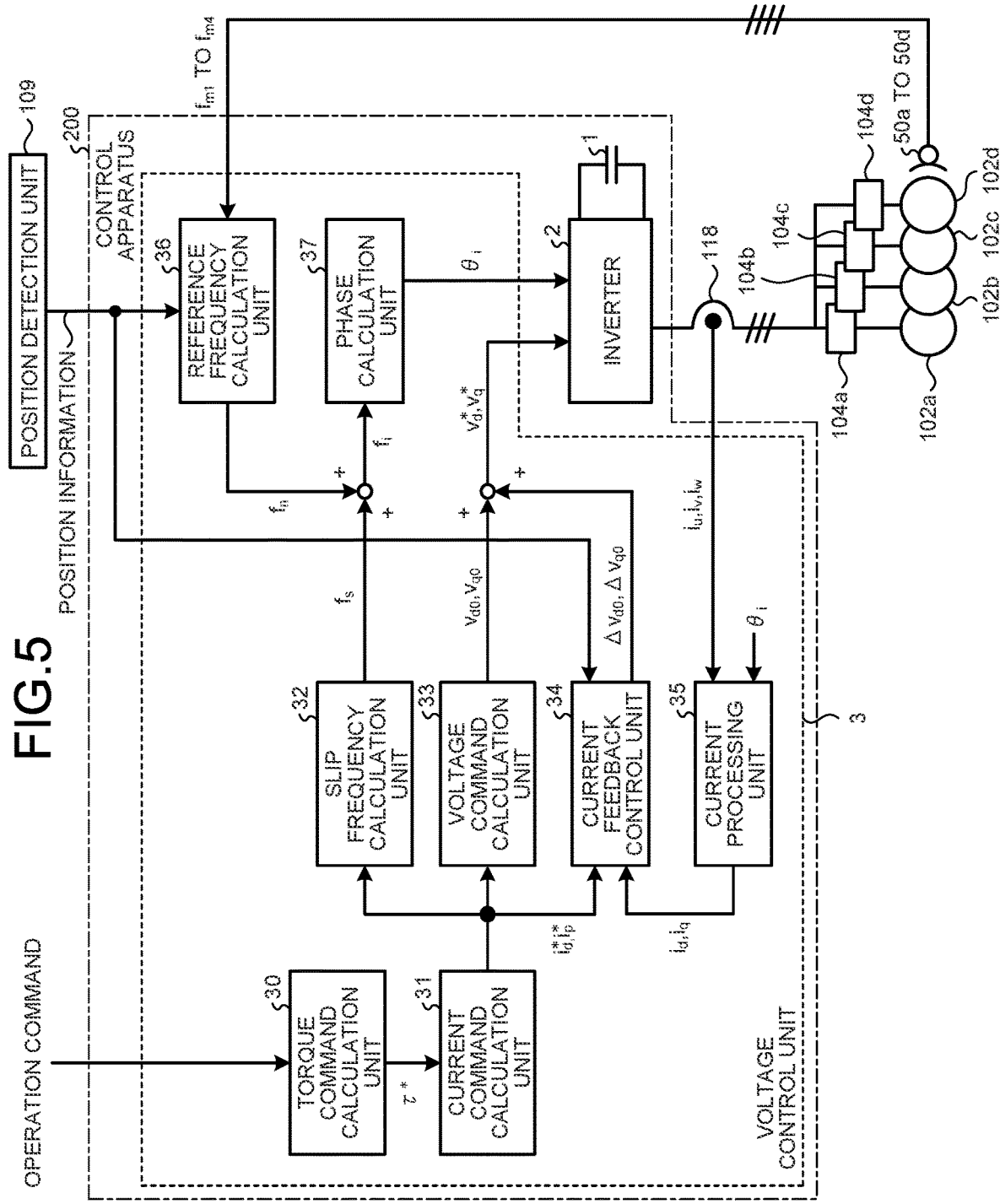
FIG. 5 is a block diagram illustrating a configuration of a control apparatus according to a third embodiment.

FIG. 5 is a block diagram illustrating a configuration of a control apparatus according to a third embodiment. The control apparatus 200 according to the third embodiment has a configuration in which position information output from the position detection unit 109 is input to a current feedback control unit 34 in the configuration of the control apparatus 200 according to the first embodiment illustrated in FIG. 2. The control apparatus 200 according to the third embodiment differs from that of the first embodiment in this respect. Note that except for this point, the configuration is the same as or equivalent to that of the first embodiment illustrated in FIG. 2. Thus, the same or equivalent constituent parts are designated by the same reference numerals, and duplicate description will be omitted.

In FIG. 5, the output of the position detection unit 109 is output to the current feedback control unit 34 as well as to the reference frequency calculation unit 36. The current feedback control unit 34 switches calculation results of a d-axis correction amount $\Delta v_{d0}$ and a q-axis correction amount $\Delta v_{q0}$, on the basis of the position information.

Figure 6:
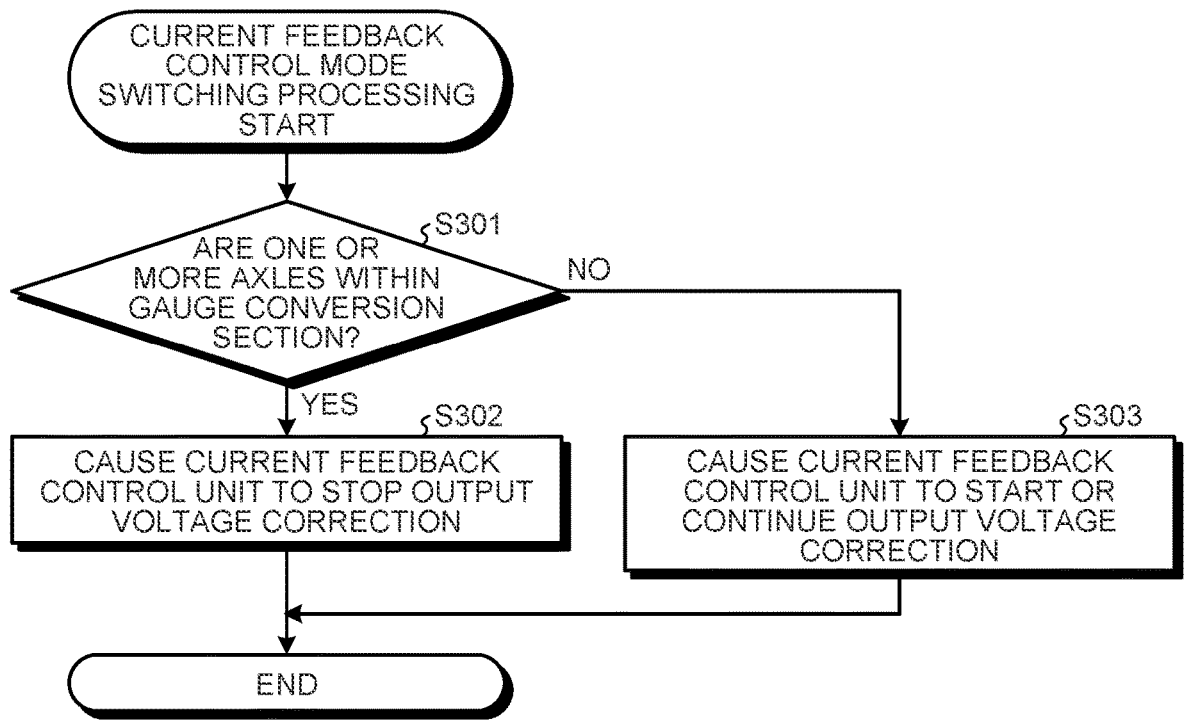
FIG. 6 is a flowchart for describing operation of a main part in the control apparatus of the third embodiment.

Operation of a main part of the third embodiment will be further described with reference to FIG. 6. FIG. 6 is a flowchart for describing operation of a main part in the control apparatus 200 of the third embodiment.

As described above, the position detection unit 109 calculates position information on the four axles 103a to 103d, and outputs calculation results to the reference frequency calculation unit 36 and the current feedback control unit 34.

As illustrated in FIG. 6, when one or more of the four axles 103a to 103d are within the gauge conversion section (steps S301, Yes), the current feedback control unit 34 performs control such that output voltage correction being performed by the current feedback control unit is stopped (step S302), which in tune completes the process of the flowchart of FIG. 6.

Furthermore, as illustrated in FIG. 6, when all the four axles 103a to 103d are located outside the gauge conversion section (step S301, No), the current feedback control unit 34 performs control such that output voltage correction is started by the current feedback control unit or output voltage correction being performed by the current feedback control unit is continued (step S303), which in turn completes the process of the flowchart of FIG. 6.

Note that the control by which the output voltage correction being performed by the current feedback control unit is stopped as co set the d-axis correction amount $\Delta v_{d0}$ and the q-axis correction amount $\Delta v_{q0}$ to zero. Furthermore, in the case where there is integral operation processing, latch processing, or the like inside the current feedback control unit, results of the processing may be reset.

Next, the significance of stopping the above-described current feedback control will be described. First, as described above, wheels race within the gauge conversion section. The load torque of a main motor driving the racing wheels is smaller than that of a main motor driving the wheels not racing. As a result, current flowing through the main motor driving the racing wheels significantly decreases.

The current feedback control unit 34 of the voltage control unit 3 in the first embodiment performs output voltage correction regardless of the position information on the four axles 103a to 103d. As described above, when there are racing wheels, current flowing through the main motor driving the racing wheels decreases such that the total value of currents actually flowing through the four main motors 104a to 104d also decreases. Then, the d-axis correction amount $\Delta v_{d0}$ and the q-axis correction amount $\Delta v_{q0}$ generated by the current feedback control unit 34 change so as to compensate for the decrease in the current. As a result, the output voltage of the inverter increases.

At this time, the increase in voltage is concentrated mainly in the main motor driving the wheels not racing. Therefore, an excessive current may flow in the main motor or an excessive torque exceeding the torque command may be generated. An overcurrent may cause a problem such as overheating, breakage, or failure of the main motor, and excessive torque may cause wheels in contact with rails to race.

In order to prevent such a phenomenon, the third embodiment gives control by which the output voltage correction being performed by the current feedback control unit 34 is stopped when one or more of the four axles 103a to 103d are within the gauge conversion section. Therefore, when the variable-gauge train 100 passes through the gauge conversion section, the current feedback control unit 34 performs the voltage correction control to thereby prevent an increase in voltage applied to the main motors 104a to 104d. As a result, it is possible to prevent the overheating, breakage, or failure of the main motors from being caused.

Furthermore, according to the control apparatus 200 of the third embodiment, even if the total value of the currents actually flowing through the main motors 104a to 104d changes when the variable-gauge train 100 passes through the gauge conversion section, the output voltage of the inverter 2 does not change. Thus, it is possible to appropriately control the driving force of wheels not racing and apply propulsive force to the train according to the operation command.

Note that while the third embodiment gives an example in which the configuration that performs the processing of stopping the current feedback control unit is applied to the control apparatus 200 according to the first embodiment, it goes without saying that this configuration can be applied to the control apparatus 200 according to the second embodiment.

Fourth Embodiment

Figure 7:
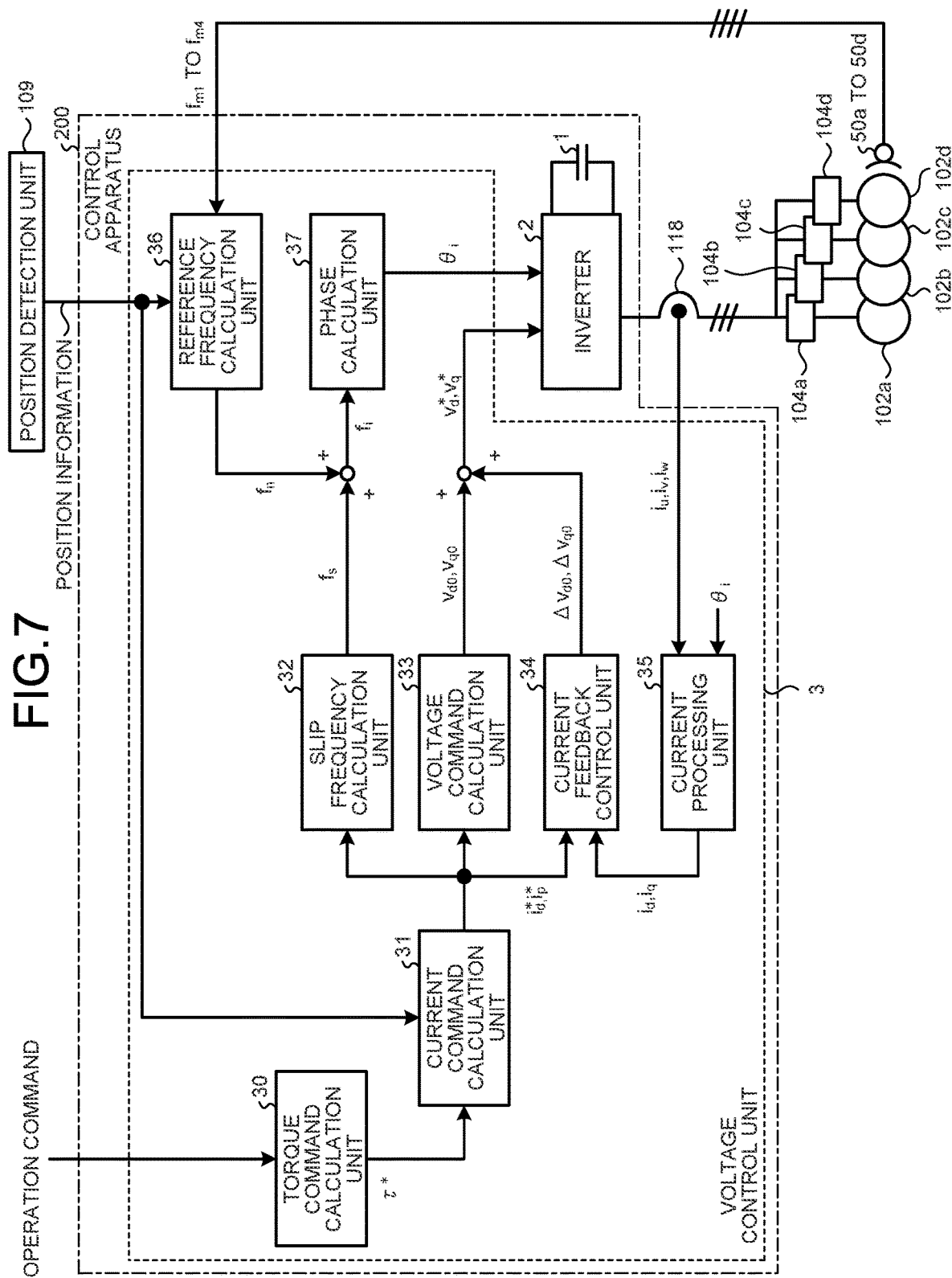
FIG. 7 is a block diagram illustrating a configuration of a control apparatus according to a fourth embodiment.

FIG. 7 is a block diagram illustrating a configuration of a control apparatus according to a fourth embodiment. The control apparatus 200 according to the fourth embodiment has a configuration in which position information output from the position detection unit 109 is input to the current command calculation unit 31 in the configuration of the control apparatus 200 according to the first embodiment illustrated in FIG. 2. The control apparatus 200 according to the fourth embodiment differs from that of the first embodiment in this respect. Note that except for this point, the configuration is the same as or equivalent to that of the first embodiment illustrated in FIG. 2. Thus, the same or equivalent constituent parts are designated by the same reference numerals, and duplicate description will be omitted.

As described above, when wheels racing and wheels not racing coexist, current varies among main motors. If current feedback control is effective at this time, current flowing through a main motor driving the racing wheels decreases, and the output voltage of the inverter increases so as to compensate for the decrease in current. This causes excessive current and excessive torque for a main motor driving the wheels not racing. Therefore, the control apparatus 200 according to the third embodiment performs control by which output voltage correction being performed by the current feedback control unit 34 is stopped when one or more of the four axles 103a to 103d are within the gauge conversion section.

In order to achieve an effect equivalent thereto, the d-axis current command $i_d^*$ and the q-axis current command $i_q^*$ may be adjusted in accordance with the number of axles located within the gauge conversion section. Therefore, the current command calculation unit 31 in the fourth embodiment calculates the d-axis current command $i_d^*$ and the q-axis current command $i_q^*$ on the basis of the torque command τ* from the torque command calculation unit 30 and the position information output from the position detection unit 109.

Figure 8:
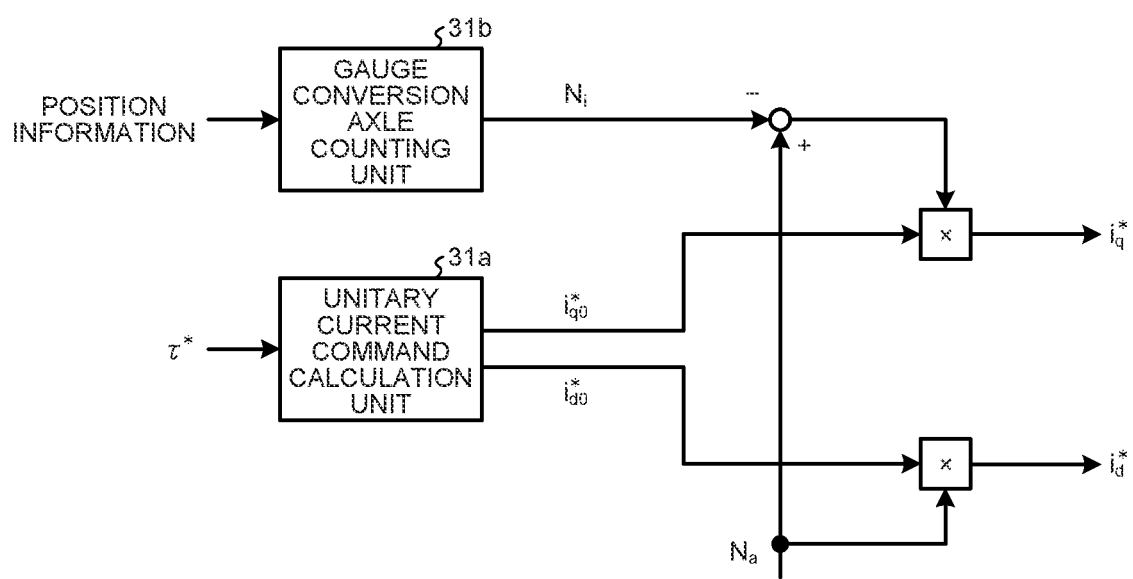
FIG. 8 is a block diagram illustrating a configuration of a current command calculation unit in the control apparatus of the fourth embodiment.

Operation of a main part of the current command calculation unit 31 in the fourth embodiment will be described with reference to FIG. 8. A unitary current command calculation unit 31a in FIG. 8 calculates a q-axis unitary current command $i_{q0}^*$ and the d-axis unitary current command $i_{d0}^*$ on the basis of the torque command τ*. The q-axis unitary current command $i_{q0}^*$ and the d-axis unitary current command $i_{d0}^*$ represent command values of current that should be generated for each main motor. Furthermore, on the basis of the position information, a gauge conversion axle counting unit 31b outputs the number $N_i$ of axles located within the gauge conversion section. Where the number of main motors to be driven by a single inverter is represented by $N_a$, the result of multiplying $i_{d0}^*$ by $N_a$ is output as the d-axis current command $i_d^*$. In addition, the result of multiplying $i_{q0}^*$ by $(N_a-N_i)$ is output as the q-axis current command $i_q^*$. Note that the operation of the current command calculation unit 31 illustrated in FIG. 8 is based on the assumption that the sum of currents flowing through the four main motors is output as a d-axis current $i_d$ and a q-axis current $i_q$ from a current processing unit 35. If the current processing unit 35 outputs current per main motor, values converted into current per main motor by being divided by $N_a$ are output as the d-axis current command $i_d^*$ and the q-axis current command $i_q^*$ in FIG. 8. Needless to say, such conversion may be performed inside the current feedback control unit 34.

As a result of the above calculation, when there are axles racing within the gauge conversion section, the q-axis current command $i_q^*$ decreases in accordance with the number of the axles racing within the gauge conversion section. Thus, current is prevented from concentrating in a main motor connected to wheels not racing, so that the same effect as that of the third embodiment can be achieved.

Note that the fourth embodiment gives an example in which the configuration that calculates the current command value in accordance with the number of axles located within the gauge conversion section is applied to the control apparatus 200 according to the first embodiment, it goes without saying that this configuration can be applied to the control apparatus 200 according to the second embodiment.

Fifth Embodiment

Figure 9:
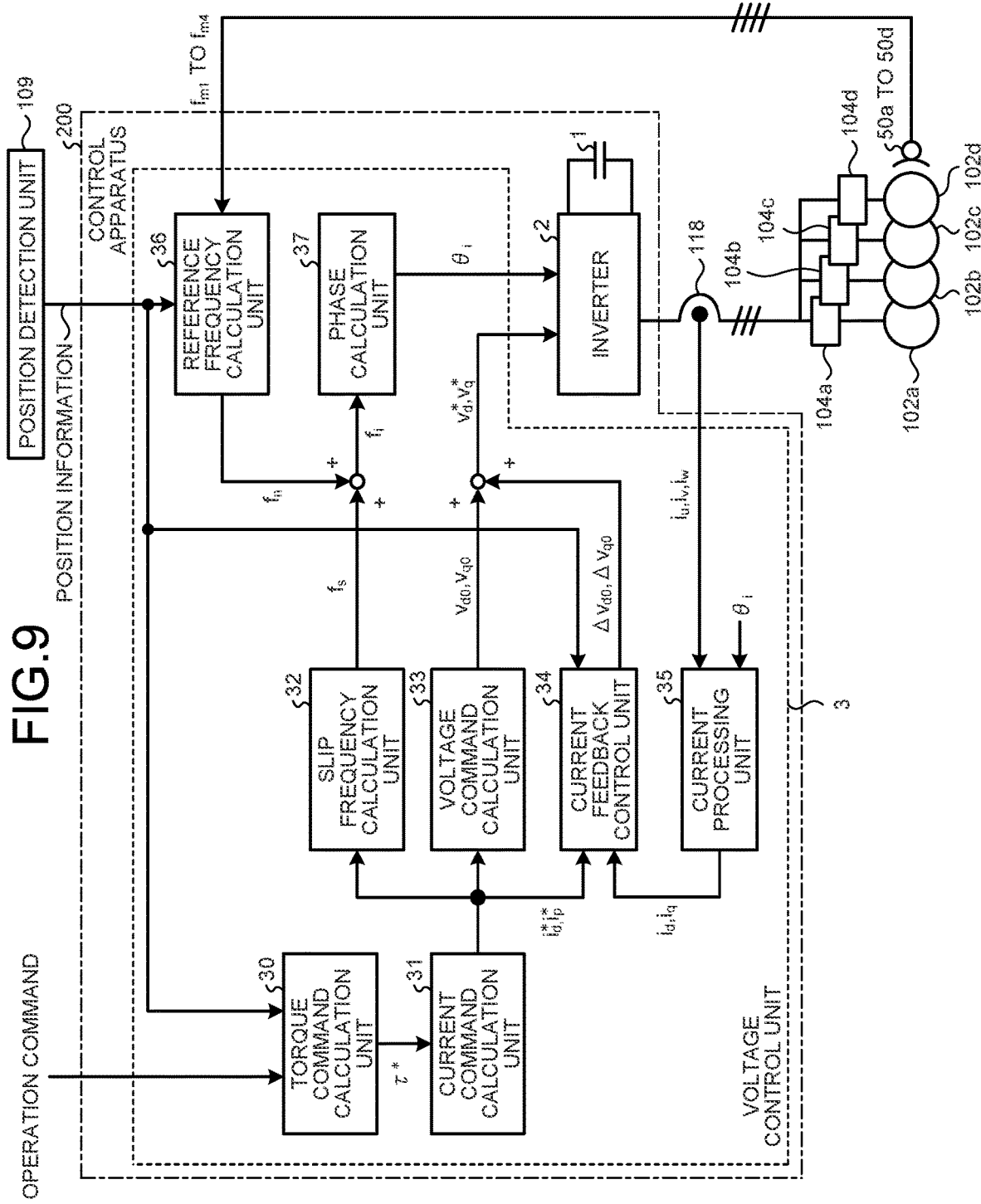
FIG. 9 is a block diagram illustrating a configuration of a control apparatus according to a fifth embodiment.

FIG. 9 is a block diagram illustrating a configuration of a control apparatus according to a fifth embodiment. The control apparatus 200 according to the fifth embodiment has a configuration in which position information output from the position detection unit 109 is input to the torque command calculation unit 30 in the configuration of the control apparatus 200 according to the third embodiment illustrated in FIG. 5. The control apparatus 200 according to the fifth embodiment differs from that of the third embodiment in this respect. Note that except for this point, the configuration of the control apparatus 200 according to the fifth embodiment is the same as or equivalent to the configuration of the third embodiment illustrated in FIG. 5. Thus, the same or equivalent constituent parts are designated by the same reference numerals, and duplicate description will be omitted.

Figure 10:
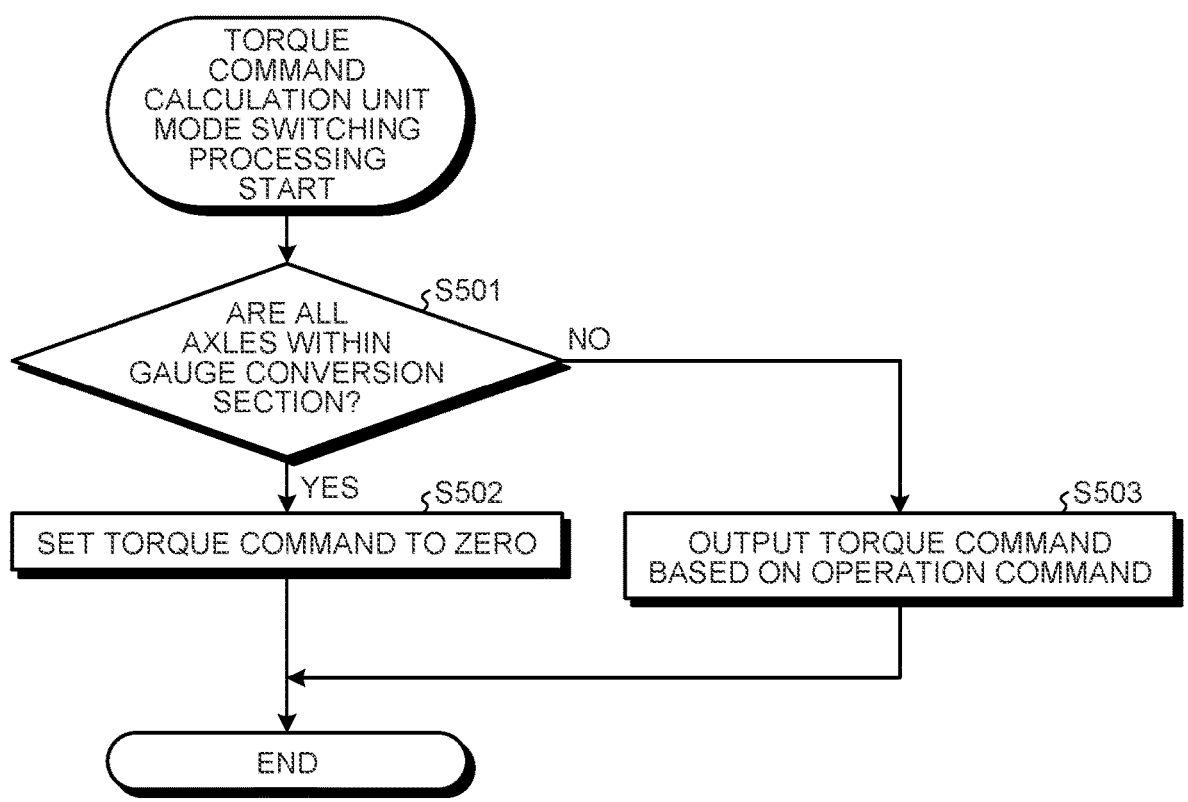
FIG. 10 is a flowchart for describing operation of a main part in the control apparatus of the fifth embodiment.

Operation of the torque command calculation unit 30 in the fifth embodiment will be described with reference to a flowchart of FIG. 10. When all the four axles 103a to 103d are within the gauge conversion section (step S501, Yes), the torque command calculation unit 30 performs control such that a torque command is set to zero (step S502), which in turn completes the process of the flowchart of FIG. 10. Furthermore, when at least one of the four axles 103a to 103d is located outside the gauge conversion section (step S501, No), a torque command based on an operation command is output (step S503), which in turn completes the process of the flowchart of FIG. 10.

Figure 11:
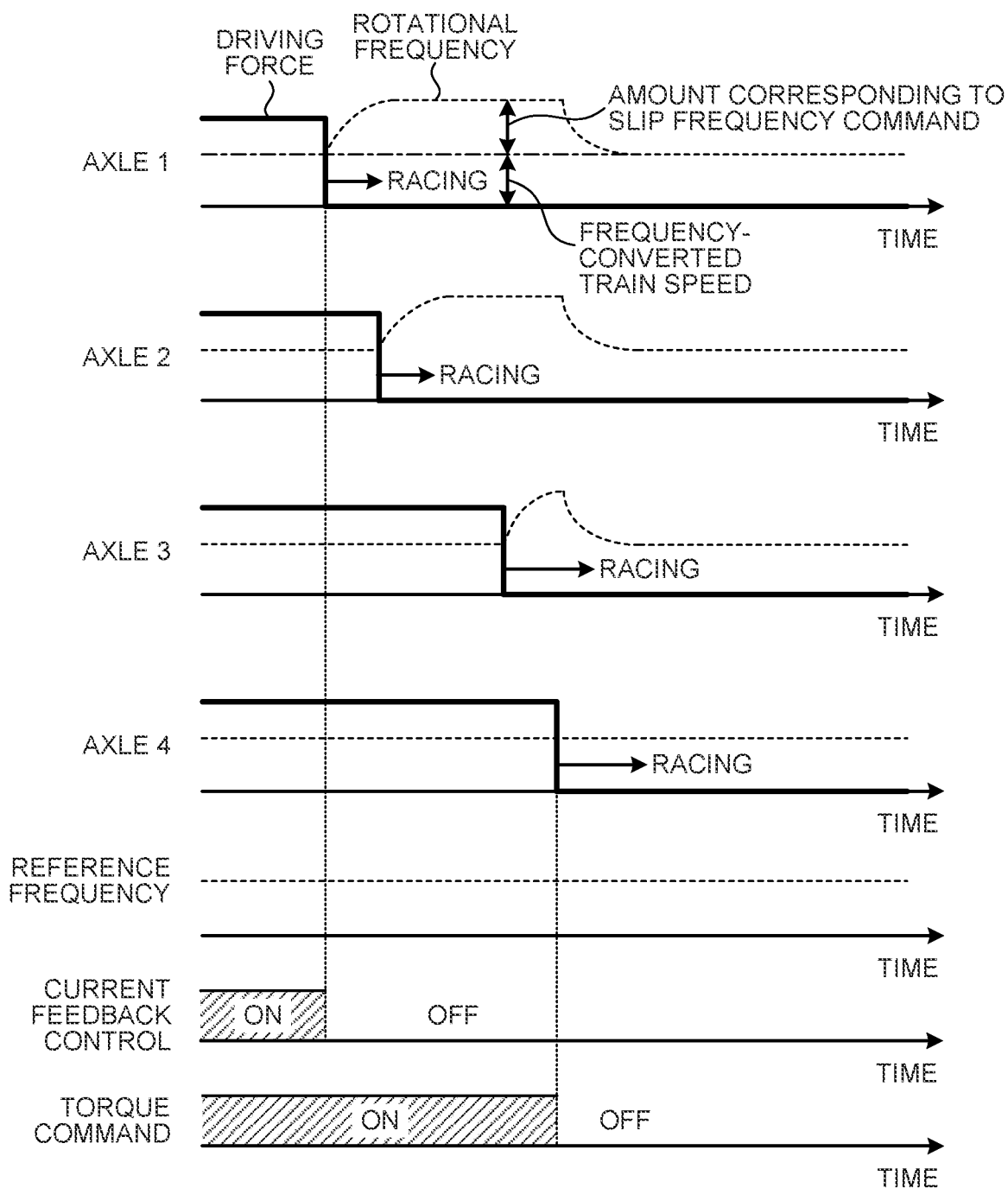
FIG. 11 is a timing chart for describing operation of axles according to the fifth embodiment to be performed when a variable-gauge train enters a gauge conversion section.
Figure 12:
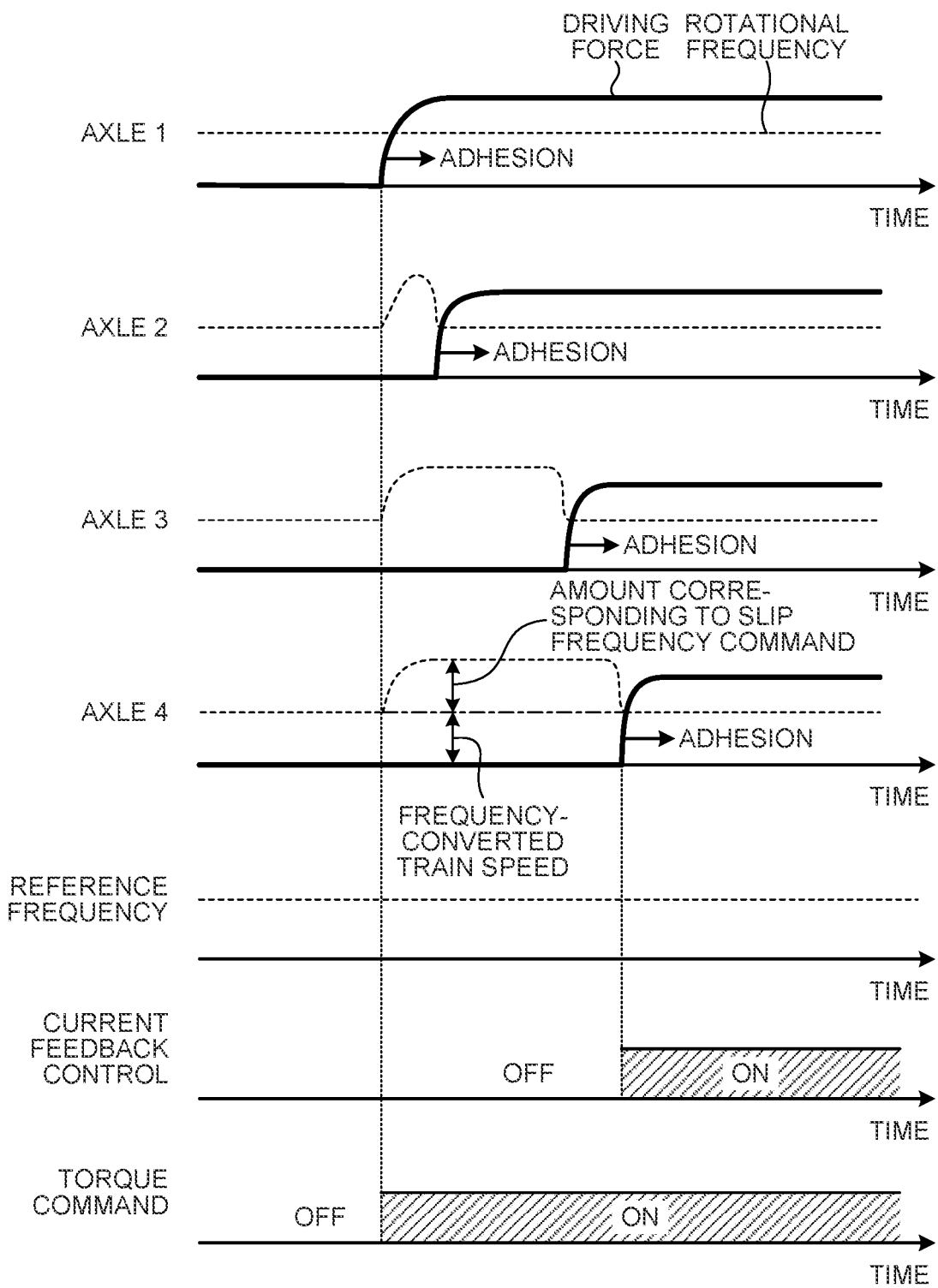
FIG. 12 is a timing chart for describing operation of the axles according to the fifth embodiment to be performed when the variable-gauge train gets out of the gauge conversion section.

Operation of a main part of the fifth embodiment will be further described with reference to FIGS. 11 and 12. FIG. 11 is a timing chart for describing operation of axles according to the fifth embodiment to be performed when the variable-gauge train 100 enters the gauge conversion section. FIG. 12 is a timing chart for describing operation of the axles according to the fifth embodiment to be performed when the variable-gauge train 100 gets out of the gauge conversion section. In the following description, "train speed converted into rotational frequency" is referred to as "frequency-converted train speed".

The upper part of FIG. 11 illustrates, as the behavior of the axles 103a to 103d, the driving forces of axles 1 to 4 and the rotational frequencies of the axles 1 to 4. The driving forces of axles 1 to 4 are indicated by solid lines, and the rotational frequencies of the axles 1 to 4 are indicated by broken lines. The lower part of FIG. 11 illustrates the reference frequency, the on/off state of the current feedback control, and the on/off state of the torque command. The timing chart, which illustrates each waveform, has the horizontal axis represented by the time and the vertical axis represented by the driving force or the rotational frequency. Furthermore, the axle 1 corresponds to the axle 103a in FIG. 1, the axle 2 corresponds to the axle 103b in FIG. 1, the axle 3 corresponds to the axle 103c in FIG. 1, and the axle 4 corresponds to the axle 103d in FIG. 1.

When the variable-gauge train 100 enters the Gauge conversion section and the axle 1 enters the gauge conversion section first, the frequency of the axle 1 increases to a value that is larger than, the frequency-converted train speed by an amount corresponding to the slip frequency, command as indicated by the broken line in the drawing, so that the axle 1 races. At this time, the current feedback control is turned off. Then, as a result of the increase in the frequency of the axle 1, the average value of the frequencies of the axles 2 to 4 located outside the gauge conversion section is treated as the reference frequency. As a result, the driving force of the axles 2 to 4 in contact with the rails outside the gauge conversion section is stably controlled. The same behavior is also exhibited when the axles 2 and 3 subsequently enter the gauge conversion section. Then, when the axle 4 enters the gauge conversion section, the torque command calculation unit 30 turns off the torque command. That is, the torque command calculation unit 30 of the control apparatus 200 according to the fifth embodiment sets the torque command to zero when all the axles 1 to 4 are within the gauge conversion section. As a result, with the frequency of the axle 4 remaining selected as the reference frequency, the slip frequency, command becomes zero, and all the four axles continue to rotate at a frequency equal to the frequency-converted train speed. Thus, over-rotation of racing wheels is prevented.

As described above, FIG. 12 illustrates the behavior of the axles 1 to 4 to be exhibited when the variable-gauge train 100 gets out of the gauge conversion section. The upper part of FIG. 12 illustrates the driving forces of the axles 1 to 4 and the rotational frequencies of the axles 1 to 4. The driving forces of the axles 1 to 4 are indicated by solid lines, and the rotational frequencies of the axles 1 to 4 are indicated by broken lines. The lower part of FIG. 12 illustrates the reference frequency, the on/off state of the current feedback control, and the on/off state of the torque command. The timing chart, which illustrates each waveform, has the horizontal axis represented by the time and the vertical axis represented by the driving force or rotational frequency. Note that FIG. 12 illustrates operation following the behavior exhibited at the time of entering the gauge conversion section illustrated in FIG. 11.

When the variable-gauge train 100 gets out of the gauge conversion section, the axle 1 located at the front in the traveling direction first gets out of the gauge conversion section, and adhesion occurs. In addition, output of the torque command is restarted when the axle 1 gets out of the gauge conversion section. At this time, the frequencies of the axles 2 to 4 increase to a value that is larger than the frequency-converted train speed by the amount of the slip frequency command. Therefore, at this point, the frequency of the axle 1 is selected as the reference frequency, and the driving force of the axle 1 is stably controlled. Similarly, driving force is also generated for each of the axles 2 and 3 at the same time as a corresponding one of the axles 2 and 3 exits the gauge conversion section. Moreover, when the axle 4 located in the rearmost position in the traveling direction gets out of the gauge conversion section, the current feedback control is turned on.

For the sake of simplicity, the above description is based on the assumption that the range of the gauge conversion section agrees with the range of the body supports 107. That is, calculation of the reference frequency, the switching of the current feedback control, and the turning on and off of the torque command are performed simultaneously with the timing at which the racing or readhesion of an axle occurs. In order to perform the gauge conversion operation more smoothly, in fact, the control may be switched a sufficient time before the timing at which the racing or readhesion of an axle occurs. In that case, the positional relationship between the gauge conversion section and the body supports 107 is set such that the gauge conversion section is longer than the body supports 107 and includes the body supports 107.

As described above, the control apparatus 200 according to the fifth embodiment performs control such that the torque command becomes zero when all the axles to be driven by a single inverter are within the gauge conversion section. Thus, it is possible to prevent over-rotation of a racing axle.

Note that while the fifth embodiment gives an example in which the configuration that performs the processing of stopping the torque command is applied to the control apparatus 200 according to the third embodiment, it goes without saying that this configuration can be applied to the control apparatus 200 according to the first, second, or fourth embodiment.

Sixth Embodiment

A hardware configuration for implementing the functions related to the voltage control units 3 of the first to fifth embodiments with software will be described with reference to FIG. 13. Note that the functions refer to the torque command calculation unit 30, the current command calculation unit 31, the slip frequency calculation unit 32, a voltage command calculation unit 33, the current feedback control unit 34, the current processing unit 35, the reference frequency calculation unit 36, and the phase calculation unit 37 in the voltage control unit 3.

Figure 13:
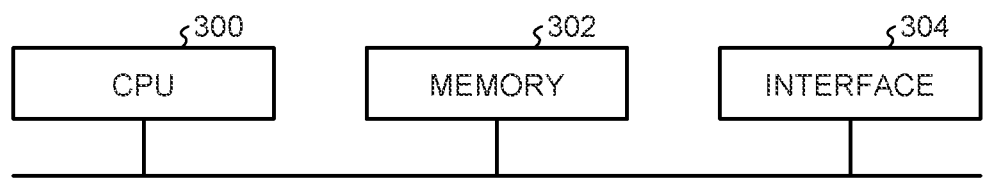
FIG. 13 is a block diagram illustrating an example of a hardware configuration in the case where functions related to voltage control units of the first to fifth embodiments are implemented by software.

When the above-described functions are implemented by software, the hardware configuration may include a central processing unit (CPU) 300, a memory 302, and an interface 304, as illustrated in FIG. 13. The CPU 300 performs operations. A program to be read by the CPU 300 is stored in the memory 302. The interface 304 is for inputting/outputting signals. Note that the CPU 300 may be a device that is referred to as an arithmetic unit, a microprocessor, a microcomputer, a processor, a digital signal processor (DSP), or the like. Furthermore, examples of the memory 302 include nonvolatile or volatile semiconductor memories such as a random access memory (RAM), a read only memory (ROM), a flash memory, an erasable programmable ROM (EPROM), and an electrically EPROM (EEPROM) (registered trademark).

Specifically, a program for executing a control function is stored in the memory 302. The CPU 300 performs various types of arithmetic processing described in the present embodiment by exchanging necessary information via the interface 304.

Figure 14:
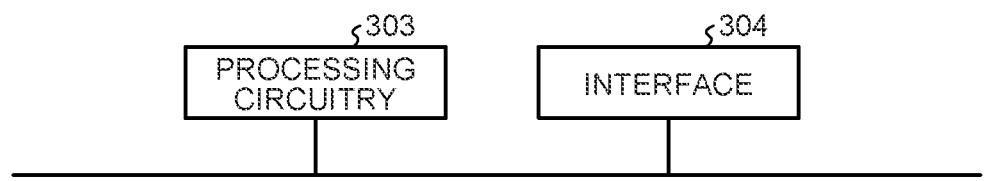
FIG. 14 is a block diagram illustrating another example of the hardware configuration related to the voltage control units of the first to fifth embodiments.

Furthermore, the CPU 300 and the memory 302 illustrated in FIG. 13 may be replaced with a piece of processing circuitry 303 as illustrated in FIG. 14. For example, a single circuit, a composite circuit, a programmed processor, a parallel-programmed processor, an application specific integrated circuit (ASIC), a field-programmable gate array (FPGA), or a combination thereof is applicable to the piece of processing circuitry 303.

Finally, switching elements to be used in the inverters in the control apparatuses of the first to fifth embodiments will be described. Semiconductor devices (IGBT, MOSFET, diode, and the like, hereinafter referred to as "silicon (Si) devices") made of Si are generally used as the switching elements to be used in the inverters of the first to fifth embodiments. Meanwhile, silicon carbide (SiC) is attracting attention in recent years, and semiconductor devices made of SiC instead of Si (hereinafter referred to as "SiC devices") are attracting attention these days.

In the case of SiC devices, switching time can be significantly reduced (about 1/10 or less) compared with conventional devices (for example, Si devices). This is a characteristic of SiC devices. Therefore, switching loss is reduced. In addition, SiC devices also have a low conduction loss. Therefore, loss in a stationary state can also be significantly reduced (about 1/10 or less) compared with the conventional devices.

The feature of the methods according to the first to fifth embodiments is to perform control such that the gate-on continues to be performed on the inverter even when the variable-gauge train 100 passes through the gauge conversion section as described above. Therefore, the number of times the switching operation is performed by the switching element increases compared with the case where the gate-on is performed on the inverter when the variable-gauge train 100 passes through the gauge conversion section. In addition, current flowing through the main motor that drives racing wheels decreases, but exciting current continues to flow. Therefore, SiC devices having a low switching loss and conduction loss are suitable for use in the control apparatus according to the present embodiment.

Note that SiC has a larger bandgap than Si, and is thus regarded as an example of a semiconductor referred to as a wide bandgap semiconductor. Semiconductors formed by use of materials other than SiC, such as gallium nitride-based materials or diamond, also belong to wide bandgap semiconductors, and many of characteristics of such semiconductors are similar to those of silicon carbide. Therefore, a configuration in which a wide bandgap semiconductor other than SiC is used also forms the gist of the present invention.

Note that the configuration illustrated in each of the above embodiments illustrates an example of the subject matter of the present invention, and it is possible to combine the configuration with another technique that is publicly known, and is also possible to omit or change part of the configuration without departing from the gist of the present invention.

REFERENCE SIGNS LIST

1 DC power source; 2 inverter; 3 voltage control unit; 30 torque command calculation unit; 31 current command calculation unit; 31a unitary current command calculation unit; 31b gauge conversion axle counting unit; 32 slip frequency calculation unit; 33 voltage command calculation unit; 34 current feedback control unit; 35 current processing unit; 36 reference frequency calculation unit; 37 phase calculation unit; 50a to 50d rotation sensor; 100 variable-gauge train; 101a, 101b track; 102a to 102d wheel; 103a to 103d axle; 104a to 104d main motor; 106 gauge converter; 107 body support; 108 guide rail; 109 position detection unit; 118 current sensor; 200 control apparatus; 300 CPU; 302 memory; 303 processing circuitry; 304 interface.

The invention claimed is:

1. A variable-gauge train control apparatus for a variable-gauge train including a plurality of axles and a plurality of main motors for driving the axles, respectively, the apparatus comprising:
an inverter to collectively control torque of the plurality of main motors; and
a voltage controller to control an output voltage of the inverter,
wherein when at least one of the plurality of axles to be driven by the plurality of main motors is within a gauge conversion section and the remaining axles of the plurality of axles are located outside the gauge conversion section, the voltage controller treats, as a reference frequency, a value obtained by conversion of an average value of rotational frequencies of the remaining axles located outside the gauge conversion section into electric frequencies of the main motors, and adds up the reference frequency and a slip frequency command to provide a frequency of the output voltage.

2. The variable-gauge train control apparatus according to claim 1, wherein the voltage controller includes:
a voltage command calculator to calculate a voltage command based on a current command; and
a current feedback controller to calculate a correction amount for the voltage command on a basis of deviations of values of current flowing through the plurality of main motors from the current command, and
when at least one of the plurality of axles is within the gauge conversion section, the voltage controller sets the correction amount to zero, or cuts off output from the current feedback controller.

3. The variable-gauge train control apparatus according to claim 2, wherein the voltage controller includes a current command calculator to calculate the current command on a basis of a torque command and the number of the axles located within the gauge conversion section.

4. The variable-gauge train control apparatus according to claim 1, wherein the voltage controller includes a torque command calculator to calculate a torque command, and
when all the plurality of axles is within the gauge conversion section, the torque command calculator sets the torque command to zero.

5. The variable-gauge train control apparatus according to claim 1, wherein when all the plurality of axles is located outside the gauge conversion section, the voltage controller treats, as a reference frequency, a value obtained by conversion of a smallest value or an average value of rotational frequencies of the plurality of axles into electric frequencies of the main motors.

6. The variable-gauge train control apparatus according to claim 1, wherein a material of a switching element to be used in the inverter is a wide bandgap semiconductor.

7. The variable-gauge train control apparatus according to claim 6, wherein the wide bandgap semiconductor is silicon carbide, gallium nitride-based material, or diamond.

8. A variable-gauge train control apparatus for a variable-gauge train, the apparatus comprising:
a single inverter to collectively control torque of a plurality of main motors; and
a voltage controller to control an output voltage of the inverter,
wherein when at least one of a plurality of axles to be driven by the plurality of main motors is within a gauge conversion section and at least one of the axles is located outside the gauge conversion section, the voltage controller treats, as a reference frequency, a value obtained by conversion of a smallest value of rotational frequencies of the plurality of axles into electric frequencies of the main motors, and adds up the reference frequency and a slip frequency command to provide a frequency of the output voltage, wherein the voltage controller includes:
- a voltage command calculator to calculate a voltage command based on a current command; and
- a current feedback controller to calculate a correction amount for the voltage command on a basis of deviations of values of current flowing through the plurality of main motors from the current command, and when at least one of the plurality of axles is within the gauge conversion section, the voltage controller sets the correction amount to zero, or cuts off output from the current feedback controller.

9. The variable-gauge train control apparatus according to claim 8, wherein the voltage controller includes a current command calculator to calculate the current command on a basis of a torque command and the number of the axles located within the gauge conversion section.

10. The variable-gauge train control apparatus according to claim 8, wherein the voltage controller includes a torque command calculator to calculate a torque command, and
when all the plurality of axles is within the gauge conversion section, the torque command calculator sets the torque command to zero.

11. The variable-gauge train control apparatus according to claim 8, wherein when all the plurality of axles is located outside the gauge conversion section, the voltage controller treats, as a reference frequency, a value obtained by conversion of a smallest value or an average value of rotational frequencies of the plurality of axles into electric frequencies of the main motors.

12. The variable-gauge train control apparatus according to claim 8, wherein a material of a switching element to be used in the inverter is a wide bandgap semiconductor.

13. The variable-gauge train control apparatus according to claim 12, wherein the wide bandgap semiconductor is silicon carbide, gallium nitride-based material, or diamond.

* * * * *